(12) United States Patent
Keune (10) Patent No.: US 11,967,224 B2
(45) Date of Patent: Apr. 23, 2024

(54) METHOD AND APPARATUS FOR CONTROLLING AN EXTERNAL DEVICE IN A CONTEXT-DEPENDENT MANNER

(71) Applicant: readio GmbH, Karlsruhe (DE)

(72) Inventor: Dirk Keune, Ettlingen (DE)

(73) Assignee: readio GmbH, Karlsruhe (DE)

( * ) Notice: Subject to any disclaimer, the term of this patent is extended or adjusted under 35 U.S.C. 154(b) by 0 days.

(21) Appl. No.: 15/768,244

(22) PCT Filed: Oct. 13, 2016

(86) PCT No.: PCT/EP2016/074553
§ 371 (c)(1),
(2) Date: Aug. 21, 2018

(87) PCT Pub. No.: WO2017/064170
PCT Pub. Date: Apr. 20, 2017

(65) Prior Publication Data
US 2018/0357888 A1      Dec. 13, 2018

(30) Foreign Application Priority Data

Oct. 14, 2015   (DE) .......................... 102015117502.9

(51) Int. Cl.
*G06F 3/0484*     (2022.01)
*G08C 17/00*      (2006.01)
(Continued)

(52) U.S. Cl.
CPC ......... *G08C 17/00* (2013.01); *H04N 21/4122* (2013.01); *H04N 21/4131* (2013.01);
(Continued)

(58) Field of Classification Search
CPC .. G06F 15/0291; G06F 3/0481; G06F 3/0484; G06F 3/04883; G06F 3/14;
(Continued)

(56) References Cited

U.S. PATENT DOCUMENTS 10,291,765 B2 *   5/2019   So ........................... H04Q 9/00
2012/0001923 A1   1/2012   Weinzimmer et al.
(Continued)

FOREIGN PATENT DOCUMENTS

EP         2827333         1/2015
WO       2014140125        9/2014

*Primary Examiner* — Dionne Pendleton
(74) *Attorney, Agent, or Firm* — Volpe Koenig (57) ABSTRACT

A method for controlling an external device (6-8, 10) having a wireless communication function (6a-8a, 10a), in which an application is executed on a mobile digital terminal (1), in particular a tablet or smartphone, and sequentially outputs digital content which changes over time by an output unit of the terminal (1), which content, in addition to the data (2a) to be output, contains a number of embedded or linked control commands which are sequentially executed by a respectively associated module (1a, 1e) of the mobile digital terminal when sequentially displaying the content in accordance with flow control (1c) of the mobile digital terminal (1), and in which, when at least one particular control command from the number of control commands is reached, a wireless communication module (1e) of the mobile digital terminal (1) is used to wirelessly control the external device (6-8, 10) in order to cause a function of the external device (6-8, 10) in a substantially synchronous manner with the display of the content or a content section.

17 Claims, 4 Drawing Sheets

(51) Int. Cl.
*H04N 21/41* (2011.01)
*H04N 21/414* (2011.01)
*H04N 21/43* (2011.01)
*H04N 21/488* (2011.01)
*G06F 15/02* (2006.01)
*G09G 5/34* (2006.01)

(52) U.S. Cl.
CPC . *H04N 21/41407* (2013.01); *H04N 21/43074* (2020.08); *H04N 21/4886* (2013.01); *G06F 15/0291* (2013.01); *G08C 2201/93* (2013.01); *G09G 5/34* (2013.01)

(58) Field of Classification Search
CPC .... G06F 3/1423; G06F 3/1431; G06F 3/1454; G08C 17/00; G08C 2201/93; G08C 17/02; G08C 2201/30; G08C 2201/21; G08C 2201/34; G09G 5/34; G09G 2370/06; G09G 2370/16; G09G 5/12; G09G 5/14; H04N 21/4122; H04N 21/4131; H04N 21/41407; H04N 21/4307; H04N 21/4886; H04N 21/43074; H04N 21/43079; A47L 11/24; A47L 11/4011; A47L 2201/00; A47L 2201/04; G05D 1/0016; G05D 1/0033; G05D 2201/0203; G05D 2201/0215; H04M 1/72533; H04M 1/7253; H04M 2203/553; H04M 2250/10; H04Q 9/00; H05B 37/0272; G07C 9/00142; G07C 9/00158; G07C 9/00563; G08B 21/22; G08B 25/008; G08B 25/016; G08B 27/006; H04L 63/0861; H04L 63/102; H04W 12/06; H04W 12/08; H04W 4/026; H04W 4/12; H04W 4/14; H04W 4/90; H04W 4/80; H04W 4/20

See application file for complete search history.

(56) References Cited

U.S. PATENT DOCUMENTS

| | | | | |
|---|---|---|---|---|
| 2013/0278484 | A1* | 10/2013 | Hwang | G06F 3/1423 345/2.3 |
| 2015/0213355 | A1* | 7/2015 | Sharma | G06N 3/006 706/11 |
| 2015/0237481 | A1* | 8/2015 | Ben-Moshe | G01S 1/70 455/456.1 |
| 2016/0026425 | A1* | 1/2016 | Lee | G06F 3/0416 345/2.2 |
| 2016/0147404 | A1 | 5/2016 | Keune | |
| 2018/0284704 | A1* | 10/2018 | Baldi | G05B 15/02 |

* cited by examiner

METHOD AND APPARATUS FOR CONTROLLING AN EXTERNAL DEVICE IN A CONTEXT-DEPENDENT MANNER

BACKGROUND

The invention relates to a method for controlling an external device with a wireless communication function, in which on a mobile digital terminal, in particular, a tablet or smartphone, an application is executed, which sequentially outputs digital content which changes over time by an output unit of the terminal, which content, in addition to the data to be output, contains a number of embedded or linked control commands, which are sequentially executed by a respectively associated module of the mobile digital terminal when sequentially displaying the content in accordance with a flow control of the mobile digital terminal.

The invention also relates to a mobile digital terminal designed to implement the method, and a software program product for such a terminal.

The display of textual content as scrolling text on the display of a mobile digital terminal (a multimedia terminal, such as a smartphone or tablet PC) using a suitable software application ("app") is known per se from WO2014/140125 A2. In addition to displaying the text as scrolling text, graphical and audio content matching the text content can be presented by a mobile digital terminal.

SUMMARY

The object of the invention is to further improve the multimedia experience for the user of terminal configured in such a way.

This object is achieved by the method, by the software program product, and by the mobile digital terminal with one or more features of the invention.

To this end, the invention creates a method for controlling an external device having a wireless communication function, in which an application is executed on a mobile digital terminal, in particular a tablet or smartphone, and sequentially outputs digital content which changes over time by an output unit of the terminal, which content, in addition to the data to be output, contains a set of embedded or linked control commands which are sequentially executed by a respectively associated module of the mobile digital terminal when sequentially displaying the content in accordance with a flow control of the mobile digital terminal, and in which, when at least one particular control command from the set of control commands is reached, the external device is wirelessly controlled by a wireless communication module of the mobile digital terminal in order to implement a function of the external device in a substantially synchronous manner with the display of the content or a section of the content.

As a result of the sequential display according to the invention of the content, for example a text or the underlying processing of the file (temporarily) stored on the mobile digital terminal, in a surprisingly simple way it is possible to implement a function of the external device in a substantially synchronized manner with the display of the content or a section of content, so that the implemented function of the external device can be selected such that it directly matches the current content. This improves the multimedia (reading) experience in an entirely novel way. As soon as a specific control command embedded or correspondingly linked in the file is reached during the sequential display of the content, for example a text, in accordance with a flow control of the mobile digital terminal, the external device can be wirelessly controlled by a wireless communication module of the mobile digital terminal, in order to implement a function of the external device in a substantially synchronous manner with the display of the content or a section of the content. Of course, the teaching according to the invention also comprises the simultaneous control of a plurality of external devices with preferably different functions.

The wireless communication between the terminal and the external device can be a communication in accordance with the Bluetooth, mobile wireless or WiFi standard, which nowadays a multiplicity of electronic devices is able to do. The invention is not limited to a particular type of communication, however.

The content can comprise at least one element from a group, which includes alphanumeric text, audio data, in particular audiobooks, and video data, in particular film data, and accordingly is not limited to a specific data type, provided it is temporally changing data.

The content can be permanently stored on the mobile digital terminal or—in the case of "streamed" content—at least temporarily stored (buffered) in a file, which in addition to the data to be output also contains the control commands.

The content is preferably obtained via an internet streaming service from a server of a computer network, preferably the internet, wherein most preferably the control commands are attached to a corresponding content stream by cloud computing—thus by the execution of suitable programs, which are not installed on the local machine (the mobile digital terminal) but on another computer which is accessed remotely (e.g. via the internet).

The attachment of the control commands in this context can be implemented in different ways in different extensions of the invention:

- The content can be stored on the server with the relevant control commands already in place; content and control commands are then downloaded to the terminal ("streamed") together and either output or used to control the device.
- The content and at least one file containing the control commands can be stored on different servers in each case; content and control commands are then downloaded to the terminal separately and there either output or used to control the device. This may include the fact that the file containing the control commands already exists and can be selected and downloaded based on knowledge of the content (e.g. on the basis of title, year of release, author, etc.). However, this can also involve the streamed content, e.g. video content, being analyzed by software techniques (e.g. via image, voice or noise recognition) in order to select and download an already existing file with the control commands based on the analysis results. The analysis can be performed externally (e.g. in the cloud) or internally (on the terminal itself).
- The content is stored on a server and is loaded from there, while the control commands, or a file containing the control commands, do/does not yet exist. A software-based content analysis (e.g. via image, voice or noise recognition) is performed externally (e.g. in the cloud) or internally (on the terminal itself), in order to generate a corresponding control command or file containing the control commands "on demand", and in particular either in parallel to the content output or separately of it in advance. The file thus generated with the control commands can then be uploaded to an appropriate server, so that it is available to future content users.

A specific design of the method is provided to display content in the form of alphanumeric text in scrolling text on a display of the terminal, which text is generated from a file, preferably permanently stored on the mobile digital terminal, and which file also contains the control commands in addition to the data to be displayed.

As already mentioned, the invention is not limited to this type of data or content, however. If text is mentioned in the following, this can always also refer to other types of content (audio and video).

If audio content is to be output, this can also take place in the context of the invention using external speakers, which can be controlled by the mobile digital terminal.

The invention additionally creates a software program product for controlling an external device with a wireless communication function, by a mobile digital terminal, in particular a tablet or smartphone, by the installation and execution of which at least on the mobile digital terminal a) an application is executed on the mobile digital terminal, which sequentially outputs a temporally changing digital content, in particular an alphanumeric text, audio data or video data, by an output unit of the terminal, in particular displays said content on a display of the terminal, in particular as scrolling text, which content contains, in addition to the output data, a set of embedded or linked control commands which are sequentially executed by a respectively associated module of the mobile digital terminal when sequentially displaying the content in accordance with a flow control of the mobile digital terminal, and b) when at least one specific control command from the set of control commands is reached, the external device is wirelessly controlled by a wireless communication module of the mobile digital terminal in order to implement a function of the external device in a substantially synchronous manner with the display of the content or a section of the content. Parts of the software can also be installed on the external device.

The invention also creates a mobile digital terminal, in particular a tablet or smartphone, which is designed to control an external device with a wireless communication function, which terminal is configured to sequentially output by an application, a digital content, in particular an alphanumeric text, audio data or video data which changes over time, by an output unit of the terminal, in particular to display said content on a display of the terminal, in particular as scrolling text, which content in addition to the data to be output contains a set of embedded or linked control commands, which are sequentially executed by a respectively associated module of the mobile digital terminal when sequentially displaying the content in accordance with a flow control of the mobile digital terminal, and which terminal is additionally configured, during the processing of the file upon reaching at least one particular control command from the set of control commands, to wirelessly control the external device by a wireless communication module of the mobile digital terminal, in order to implement a function of the external device in a substantially synchronous manner with the display of the content or a section of the content.

Finally, the invention creates a mobile digital terminal, in particular a tablet or smartphone, with a software program product stored on the terminal for controlling an external device with a wireless communication function, by a mobile digital terminal, in particular a tablet or smartphone, by the installation and execution of which at least on the mobile digital terminal a) an application is executed on the mobile digital terminal, which sequentially outputs a temporally changing digital content, in particular an alphanumeric text, audio data or video data, by an output unit of the terminal, in particular displays said content on a display of the terminal, in particular as scrolling text, which content contains in addition to the output data a set of embedded or linked control commands which are sequentially executed by a respectively associated module of the mobile digital terminal when sequentially displaying the content in accordance with a flow control of the mobile digital terminal, and b) when at least one specific control command from the set of control commands is reached, the external device is wirelessly controlled by a wireless communication module of the mobile digital terminal, in order to implement a function of the external device in a substantially synchronous manner with the display of the content or a section of the content.

A further extension of the invention provides that when outputting text the scrolling text is displayed sequentially on the display terminal horizontally, in particular contrary to a reading direction, and especially from right to left. The scrolling speed of the text is selectively adjustable. It may be reduced, in particular during the implementation of the function of the external device, to effectively enhance an effect of the function of the external device.

Another extension of the method according to the invention provides that the function of the external device which is implemented is at least one change in an operating state of the external device, in particular an activation, a deactivation, a color change, a brightness change, an intensity change, a temperature change, a volume change, a phase change, a provision of data, a provision of fragrances, a change in a display status or a change in a motion state. Possible controllable functions depend on the external device being used. Any combination of functions and/or devices are readily possible within the context of the invention.

A further extension of the method according to the invention provides that the external device is a wirelessly addressable internet access device and the function of the external device which is implemented includes a provision of data for the mobile terminal and the execution or display thereof by the mobile terminal, in particular the provision of a music playlist by a server computer, preferably over the internet or mobile wireless, or that the function of the external device that is implemented includes an activation of a further external device, preferably over the internet. The external device therefore does not need to be wirelessly connected to the terminal directly, but instead the connection can be made indirectly via an internet an access device (router) or via mobile wireless. This allows, in particular, geographically distant external devices also to be controlled in a physically disconnected way. The playlist download can be launched by using the beginning of a text to be displayed in scrolling text (e.g. news text) as a control command for controlling the external device.

A preferred extension of the method according to the invention provides that the external device is a wirelessly switchable light bulb, in particular an LED light bulb, preferably dimmable and/or variable in color. For example, this enables darkness, flashes, sunrise and sunset and other natural phenomena, etc. to be simulated, if this fits in with the context of the text section currently being displayed. Also, a mood lighting can be achieved, which matches the context of the text section currently being displayed.

Another preferred extension of the method according to the invention provides that the external device is a children's toy, a model vehicle, model airplane, doll or similar. The above-mentioned devices can thus execute synchronous movements, etc., while reading, and so enrich the reading experience.

An alternative design of the method according to the invention provides that the external device is an audio playback device. In this way, synchronized music, background noise etc. can be played back while reading, with improved quality compared to an integrated speaker of the terminal. The audio playback device can also be integrated into a different device, for example, in a children's toy or in an image display device.

In another alternative extension of the method according to the invention the external device is an image display device, in particular an electronic picture frame, a television, monitor, display or similar. In this way, in particular, the effect of a background image can be further increased as befits the context of the text section currently being displayed.

A further alternative extension of the method according to the invention provides that the external device is an electromechanical massager, in particular a vibrator, or that the external device is a perfume or fragrance dispenser. In this way, the reading enjoyment can be associated with other sensory perceptions, in particular pleasant ones. Especially when reading erotic novels or the like, the external device can be designed as a kind of sex toy, to enable an intended effect of the currently displayed text section also to be experienced physically. As a general rule, the external device in the context of the invention is designed to trigger any form of physically perceptible stimuli in a user of the method.

In general terms, it can be provided that a conceptual content of a text section in the alphanumeric data of which the control command is embedded or linked, is phenomenologically related to the function of the external device.

Further extensions of the terminal are characterized by the fact that by appropriate configuration of the same, or by the software program product stored on the terminal, when it is installed and executed at least on the mobile digital terminal a method having the other features of a corresponding extension of the method according to the invention is executed.

BRIEF DESCRIPTION OF THE DRAWINGS

Further characteristics and advantages are obtained from the following description of exemplary embodiments based on the drawing.

DETAILED DESCRIPTION

Figure 1:
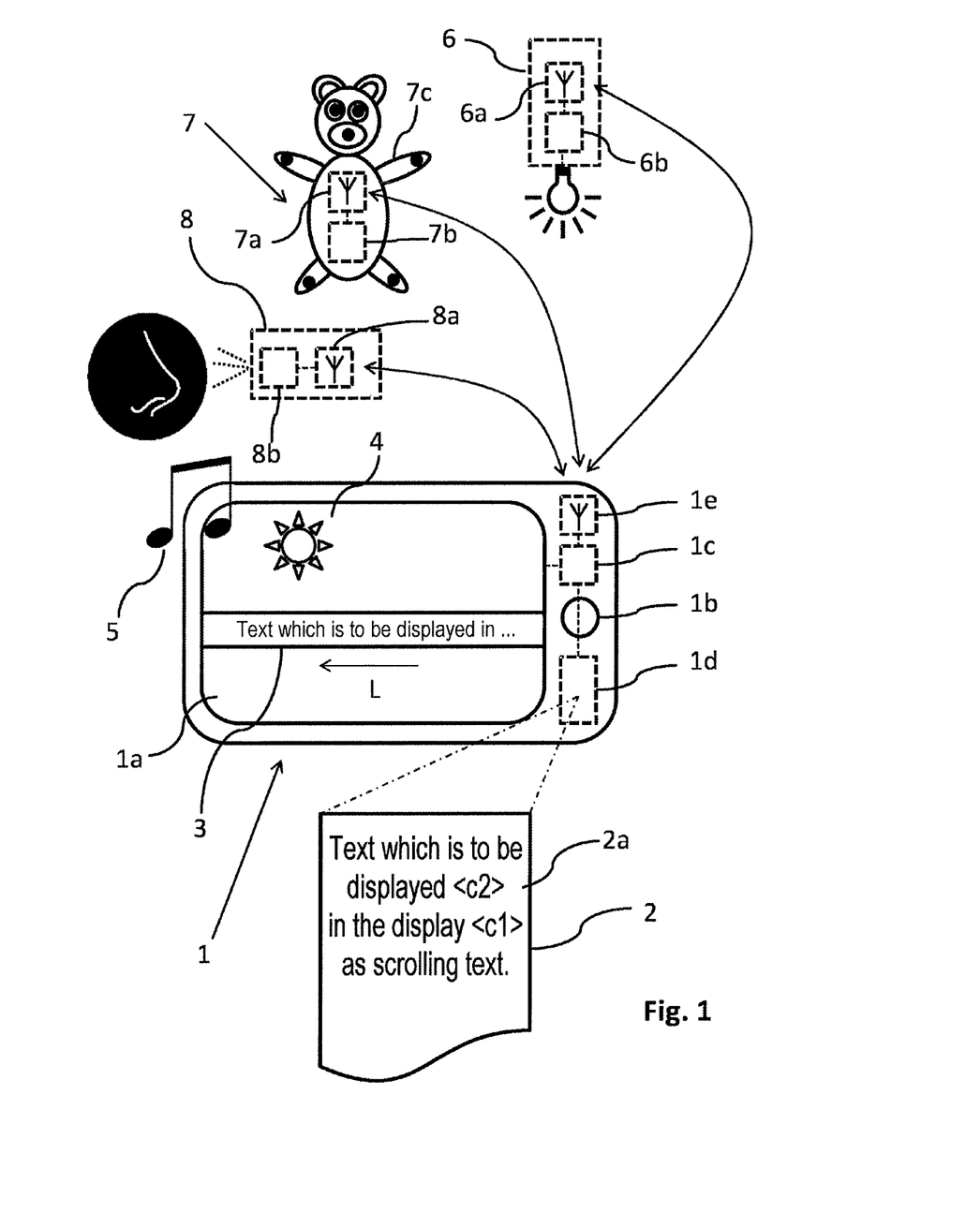
FIG. 1 shows first embodiments of a terminal according to the invention as well as a method according to the invention.

FIG. 1 shows in schematic form first embodiments of a terminal according to the invention and of a method according to the invention. Reference numeral 1 refers to a mobile digital multimedia terminal, for example a smartphone, with a display 1a, a control element 1b, a processor 1c for controlling the operation of the device, a memory unit 1d, and a wireless communication module 1e, for example a Bluetooth, WLAN or wireless module. Furthermore, the terminal 1 has an integrated audio output module, which is not explicitly depicted. The processor 1c controls the entire operation of the terminal 1. To this end, it is actively connected at least to the memory unit 1d, the wireless communication module 1e and the display 1a for the purpose of signal transmission (dotted lines). In principle, the terminal 1 can be a conventional multimedia terminal of a known type, so that there is no need to discuss the rest of the structure.

In the memory at least one file 2 is (temporarily) stored, which comprises a digital content to be displayed in the display 1a in the form of text 2a, consisting of alphanumeric characters (numbers, letters, punctuation marks, etc.). This text 2a is displayed, under the control of the processor 1c or an application (app) running on the terminal 1, on the display 1a in the form of a scrolling text 3 running horizontally from right to left, in the direction of the arrow L, as described in detail in WO2014/140125 A2, wherein reference can be made to that document here. Also, the other functions of the terminal described below can be implemented by a suitable app installed and executed on the terminal device. This can be the same app that has already been mentioned above.

The text 2a or the file 2 additionally contains control characters or control commands <c1>, <c2>, which are embedded in or appropriately linked at specific points in the text 2a. Now, if the text 2a is converted into running text 3 and displayed, when a control character <c1>, <c2> is reached the terminal 1 executes a predefined action associated with this control character in accordance with the processor 1b, so that the action is therefore performed in a substantially synchronous manner with the text display or the progress of the reading. From WO2014/140125 A2, for example, it is known to output a background image 4 and/or an audio content (music, noise, . . . ) which matches the context of the text section currently being displayed in the display 1a when a control character is reached. For this purpose, the appropriate modules of the terminal 1 (display 1a, loudspeaker) are suitably activated. The content to be additionally output can also be stored in the memory unit 1d separately from the file 2.

In the present case, the possibility now exists to address and activate the wireless communication module 1e of the terminal 1 in accordance with the processor 1c upon reaching a specific control character <c1>, <c2> and to initialize a wireless communication with an external device. FIG. 1 shows examples of three such external devices, namely a wireless remote-controllable LED lamp or bulb 6, a motor-driven moveable children's toy (teddy bear) 7 and a fragrance dispenser 8. Each of these devices 6-8 comprises a wireless communication module 6a-8a, which corresponds in communication technology terms with the wireless communication module 1e of terminal 1, hence it can be addressed by the latter. Each wireless communication module 6a-8a is linked to a functional element 6b-8b of the respective external device 6-8 by signal techniques, in order to trigger an associated function of the external device 6-8 when the wireless communication module 6a-8a receives a suitable control signal.

Function element 6b can be designed as an on/off switch for the lamp/light 6. In addition, under suitable control the brightness or color of the lamp/light 6 can be specifically selected. Function element 7*b* can be designed as a motorized means for moving the head and/or limbs 7*c* of the teddy bear 7. Additionally or alternatively, the teddy bear 7 can be provided with a loudspeaker for audio outputs (not shown). Function element 8*b* can be used as a spray device for the emission of fragrances. The invention is not limited to any particular kind or set of function elements. Different functional elements can be used sequentially, alternately and/or in combination. The essential feature is the activation of an external device function with the text section currently being displayed and read, in a synchronous manner due to the sequential text display.

For example, if the text section currently being displayed and read describes a particular smell, this can be generated in a temporally appropriate way using the fragrance dispenser 8 when the relevant control character <c1>, <c2> is reached, wherein the synchronism between the reading experience and the external device function occurs quasi-automatically due to the sequential text display. The same applies of course to movements (or sounds, etc.) of the teddy bear 7 or the lighting effects induced by the lamp/light 6 (flashes, torch flickering, dusk, darkness).

If an external device is a sex toy or the like (not shown), specific types of physical stimulation can be realized in synchrony with the reading experience.

Figure 2:
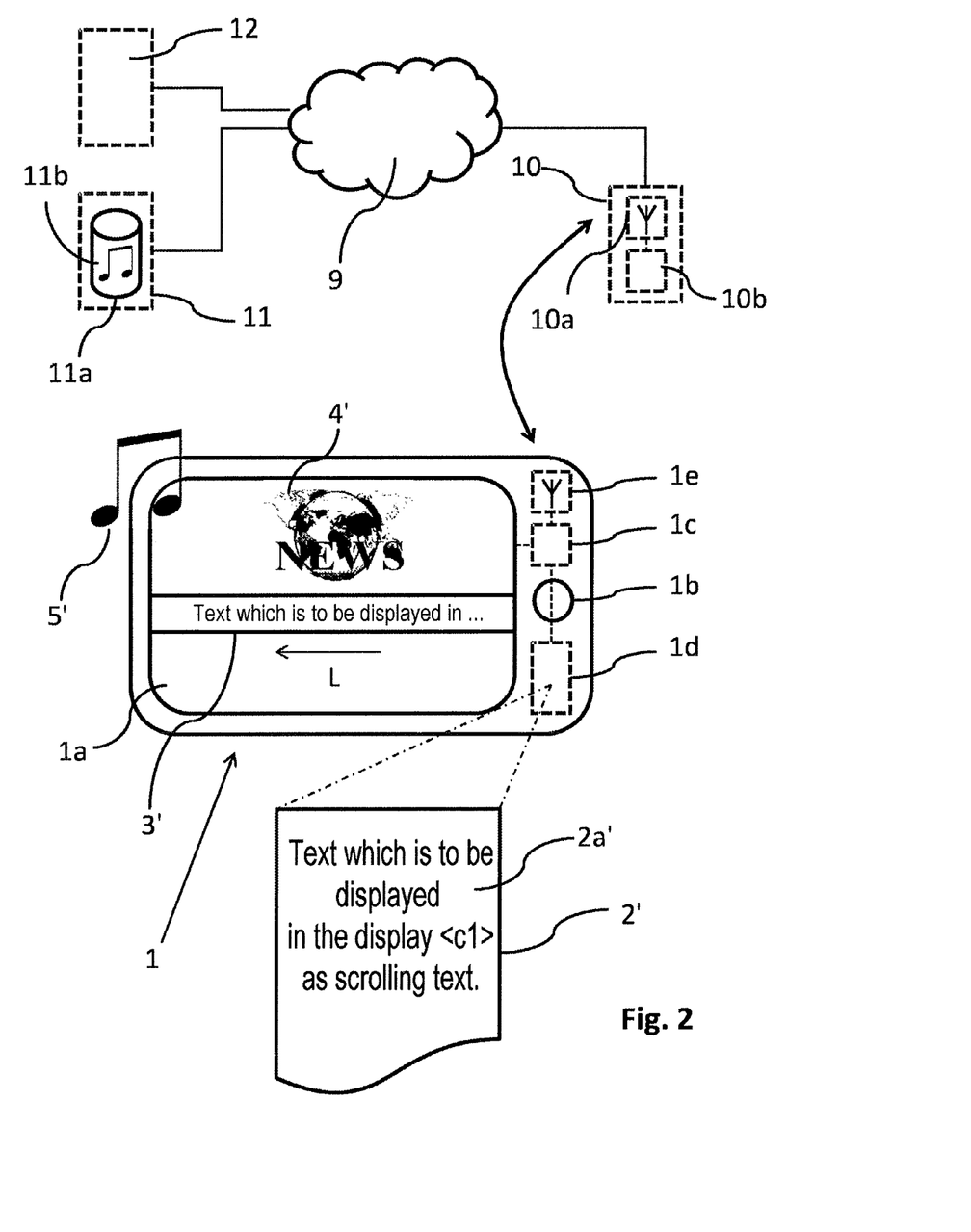
FIG. 2 shows further embodiments of a terminal according to the invention and of a method according to the invention.

FIG. 2 schematically shows further embodiments of a terminal according to the invention and of a method according to the invention, wherein identical reference numerals designate identical or identically functioning elements in relation to FIG. 1.

An example of a use case is presented, in which the terminal 1 displays a news program 4', which is preferably accessed from the internet (or other computer network) via WLAN or a mobile wireless connection. The latter is shown symbolically in FIG. 2 under reference numeral 9. The program 4', and/or its data 2' loaded onto the terminal 1, includes or consists solely of text 2*a'*, which is displayed as scrolling text 3' on the display 1*a* of the terminal 1, possibly with (silent) background images or videos. Reference numeral 10 designates a wirelessly addressable mobile wireless or internet/computer network access device, such as a router, with a wireless communication module 10*a* and other modules 10*b*, via which access device 10 terminal 1 sets up a connection to the network 9. Also connected to the network 9 and shown by examples are servers 11, 12, one of which (11) comprises a memory 11*a* on which (music) data 11*b* of a user of the terminal 1 are stored, for example in the manner of a playlist. Server 12 can be the content server for the accessed (in particular "streamed") program 4'. The modules 10*b* can be designed to generate, manage, execute etc., commands for communication with the servers 11, 12, in order to provide content for the terminal 1 over the network 9. This is equivalent to the statement that the function of the external device (access device 10) which is implemented includes a provision of data for the mobile terminal 1 and its execution or display by the mobile terminal, in particular the provision of a music playlist 11*b* by the server computer 11, preferably via the internet 9. This function can again be triggered by a control character <c1> in the data 2', so that when displaying the scrolling text 3' the user automatically has music from his/her playlist loaded onto the terminal 1 for listening to. Reference numeral 5' refers to the corresponding audio output. Control character <c1> can be the beginning and/or a corresponding identifier of the text data to be displayed.

Alternatively, reference numeral 12 can represent an external device which is arranged remote from a location of the terminal 1. This external device is then controlled analogously to the method according to FIG. 1. This is equivalent to the statement that the function of the external device that is implemented also includes the control of another external device, preferably via the internet or by mobile phone.

Figure 3:
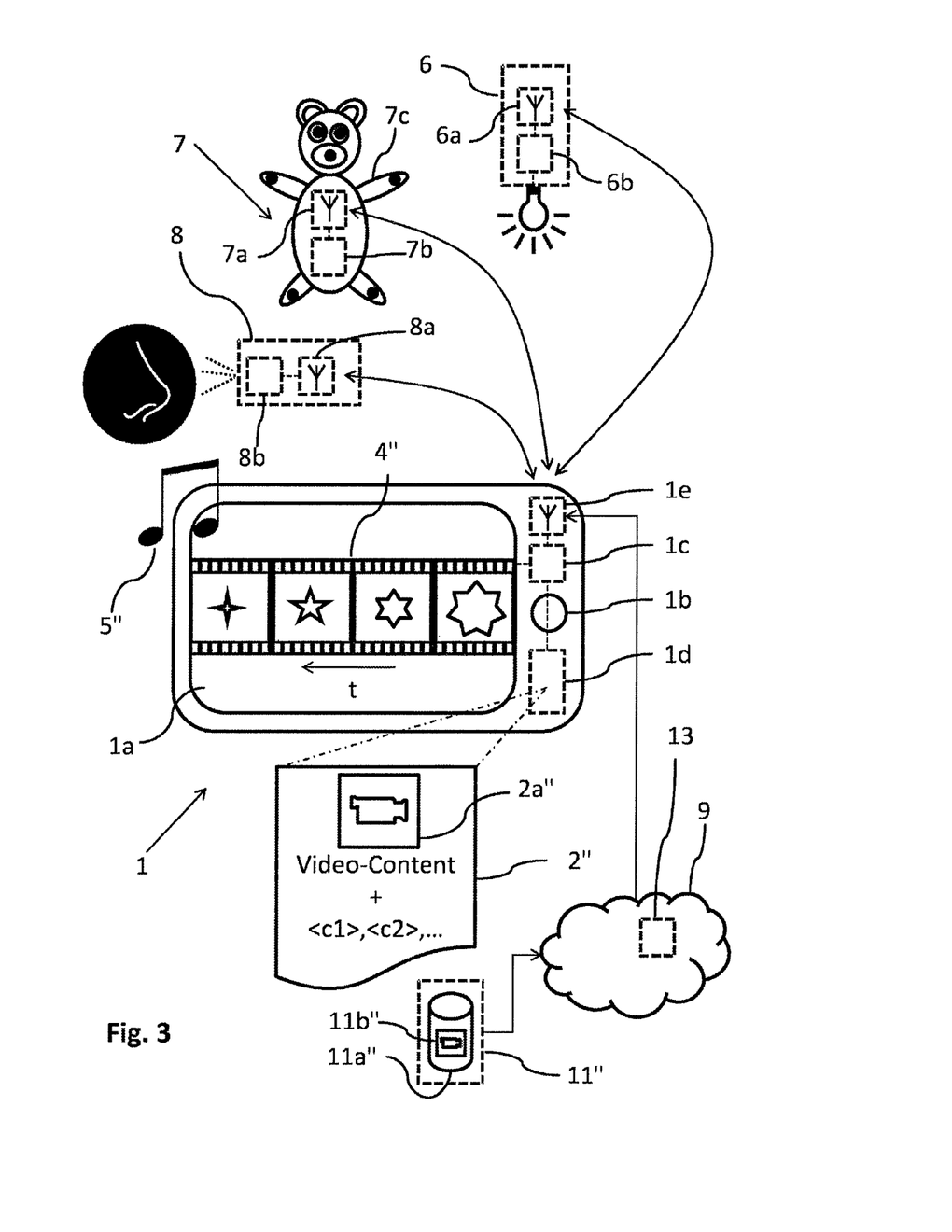
FIG. 3 shows further embodiments of a terminal according to the invention as well as a method according to the invention.
Figure 4:
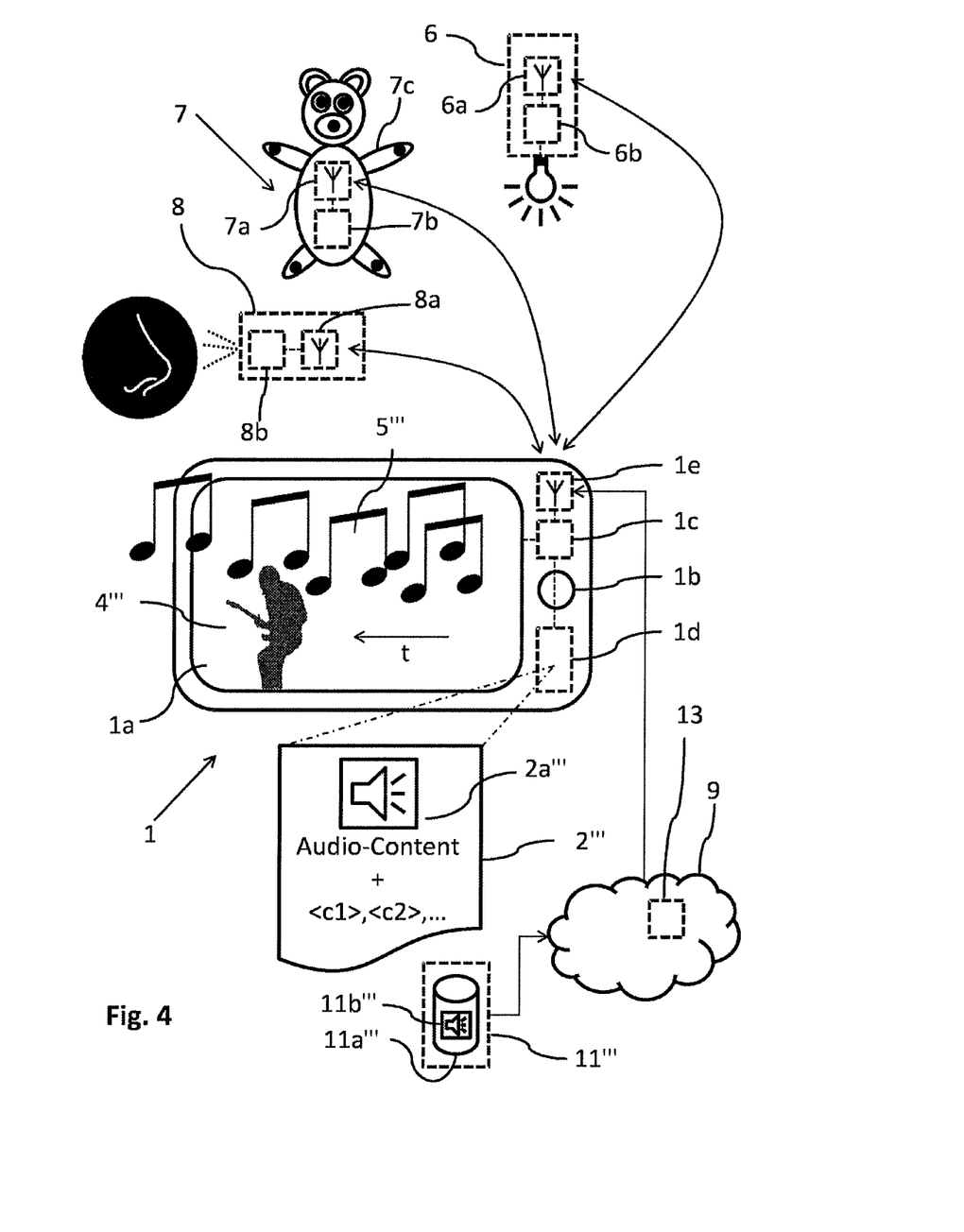
FIG. 4 shows further embodiments of a terminal according to the invention and of a method according to the invention.

FIG. 3 and FIG. 4 schematically show further embodiments of a terminal according to the invention and of a method according to the invention, wherein identical reference numerals designate identical or identically functioning elements in relation to FIG. 1.

In accordance with the design in FIG. 3, at least one file 2" is (temporarily) stored in the memory unit 1*d*, which comprises a digital content in the form of video data 2*a"* to be displayed in the display 1*a*. This video content 2*a"* is displayed on the display 1*a* in accordance with the processor 1*c* or an application (app) executed on the terminal 1, in the form of temporally (arrow t) variable images 4", as shown symbolically by a film strip. This also typically includes the output 5" of associated audio content. Also, the other functions of the terminal described below can be implemented by a suitable app installed and executed on the terminal device. This can be the same app that has already been mentioned above.

The video content 2*a"* or the file 2" additionally contains control characters or control commands <c1>, <c2>, which are embedded in or appropriately linked to the content 2*a"* at specific points in the text. Now, if the content 2*a"* is output sequentially, when a control character <c1>, <c2> is reached the terminal 1 executes a predefined action associated with this control character in accordance with the processor 1*b*, so that the action is therefore performed in a substantially synchronous manner with the content display.

In the context of the invention there is again the possibility, when reaching a specific control character <c1>, <c2> to address and activate the wireless communication module 1*e* of the terminal 1 in accordance with the processor 1*c*, in order to initialize a wireless communication with an external device. FIG. 3 shows an example of three such external devices, which have already been referred to in conjunction with FIG. 1. Reference can be made to the part of the description there.

The invention is again not limited to one kind or set of functional elements. Different functional elements can be used sequentially, alternately and/or in combination. The essential feature is the synchronous activation of an external device function with the section of content currently being displayed, due to the sequential content output as already described above.

For example, if the content currently displayed describes a particular smell, this can be generated in a temporally appropriate way using the fragrance dispenser 8 when the relevant control character <c1>, <c2> is reached, wherein the synchronism between the visual experience and the external device function occurs quasi-automatically due to the sequential content output. The same applies of course to movements (or sounds, etc.) of the teddy bear 7 or the lighting effects induced by the lamp/light 6 (flashes, torch flickering, dusk, darkness).

If an external device is a sex toy or the like (not shown), specific types of physical stimulation can be realized in synchrony with the visual experience without the need for any corresponding, relevant user input into the terminal 1.

The video content can be obtained via a computer network 9 (preferably the internet), for example by streaming.

An example of a use case is presented, in which the terminal 1 outputs the image 4" and sound 5", which are preferably accessed from the internet (or other computer network) via WLAN or a mobile wireless connection. The latter is shown symbolically in FIG. 3 under reference numeral 9. With regard to the means of accessing the computer network 9, reference is made to the appropriate description of FIG. 2 (reference numerals 10, 10*a* and 10*b*). Server 11" with memory 11*a*" can be the content server for the accessed (in particular "streamed") content 11*b*". On the terminal 1 itself (by the processor 1*c*) or in advance by cloud computing (service 13), control characters <c1>, <c2>, . . . are added to the content at the appropriate locations, so that when outputting the data 2", again when a specific control character <c1>,<c2> is reached, in accordance with the processor 1*c* the wireless communication module 1*e* of the terminal 1 can be addressed and activated in order to initialize a wireless communication to an external device, as described in detail above.

In accordance with the design in FIG. 4, at least one file 2''' is (temporarily) stored in the memory 1*d*, which file primarily comprises an audio content (audio data) 2*a'''* to be output via the loudspeaker of the terminal 1, for example, an audiobook or music, see reference numeral 5'''. To achieve this, digital content to be displayed in the display 1*a* can be available in the form of image or video data (reference numeral 4"). This audio content 2*a*" is output in accordance with the processor 1*c*, or an application (app) executed on the terminal 1, in the form of temporally (arrow t) variable sounds/noises 5''', as shown symbolically by a music score. This typically also includes the output 4" of associated image/video content (background images, animations, music videos or similar content). Also, the other functions of the terminal described below can be implemented by a suitable app installed and executed on the terminal device. This can be the same app that has already been mentioned above.

The audio content 2*a'''* or the file 2''' additionally contains control characters or control commands <c1>, <c2> which are embedded in or appropriately linked to the content 2*a'''* at specific points in the text. Now, if the content 2*a'''* is output sequentially, when a control character <c1>, <c2> is reached the terminal 1 executes a predefined action associated with this control character in accordance with the processor 1*b*, so that the action is therefore performed in a substantially synchronous manner with the content display.

In the context of the invention there is again the possibility, when reaching a specific control character <c1>, <c2>, to address and activate the wireless communication module 1*e* of the terminal 1 in accordance with the processor 1*c* to initialize a wireless communication with an external device. FIG. 4 shows an example of three such external devices that have already been referred to in connection with FIG. 1. Reference can be made to the part of the description there.

The invention is again not limited to one kind or set of function elements. Different functional elements can be used sequentially, alternately and/or in combination. The essential feature is the synchronous activation of an external device function with the section of content currently being displayed, due to the sequential content output as already described above.

For example, if the content currently displayed describes a particular smell, this can be generated in a temporally appropriate way using the fragrance dispenser 8 when the relevant control character <c1>, <c2 is reached, wherein the synchronism between the listening experience and the external device function occurs quasi-automatically due to the sequential content output. The same applies of course to movements (or sounds, etc.) of the teddy bear 7 or the lighting effects induced by the lamp/light 6 (flashes, torch flickering, dusk, darkness).

If an external device is a sex toy or the like (not shown), targeted types of physical stimulation can be realized in synchrony with the listening experience without the need for a corresponding, relevant user input into the terminal 1.

The audio content can be obtained via a computer network 9 (preferably the internet), for example by streaming. An example of a use case is presented, in which the terminal 1 outputs image 4''' and sound 5''', which are preferably accessed from the internet (or other computer network) via WLAN or a mobile wireless connection. The latter is shown symbolically in FIG. 4 under reference numeral 9. With regard to the means of accessing the computer network 9, reference is made to the appropriate description of FIG. 2 (reference numerals 10, 10*a* and 10*b*). Server 11''' with memory 11*a'''* can be the content server for the accessed (in particular "streamed") content 11*b'''*. On the terminal 1 itself (by the processor 1*c*) or in advance by cloud computing (service 13), control characters <c1>, <c2>, . . . are added to the content at the appropriate locations, so that when outputting the data 2''', again when a specific control character <c1>,<c2> is reached, in accordance with the processor 1*c* the wireless communication module 1*e* of the terminal 1 can be addressed and activated in order to initialize a wireless communication to an external device, as described in detail above.

The invention claimed is:

1. A method for controlling an external device (6-8, 10) having a wireless communication function, the method comprising executing an application on a mobile digital terminal (1), the application sequentially outputting digital content which changes over time by an output unit of the mobile digital terminal (1), said content containing a set of embedded or linked control commands (<c1>, <c2>), the mobile digital terminal sequentially executing the embedded or linked control commands when sequentially displaying the content in accordance with a flow control (1*c*) of the mobile digital terminal (1), and when at least one specific control command (<c1>, <c2>) from the set of control commands (<c1>, <c2>) is reached, a wireless communication module (1*e*) of the mobile digital terminal (1) wirelessly controlling the external device (6-8, 10) in order to implement a function of the external device (6-8, 10) in a substantially synchronous manner with the display of the content or a section of the content, the content comprising at least alphanumeric text (2*a*, 2*a*'), displaying the content as the alphanumeric text (2*a*, 2*a*') as scrolling text (3, 3') on a display (1*a*) of the terminal (1), said text (2*a*, 2*a*') is generated from a file (2, 2') that contains the control commands (<c1>, <c2>) in addition to the data to be displayed, and displaying the scrolling text (3, 3') horizontally and sequentially on the display (1*a*) of the terminal (1), wherein said function of the external device (6-8, 10) is commanded automatically by the mobile digital terminal (1) in synchronism with sequentially displaying of the alphanumeric text (2*a*, 2*a*') on the display (1*a*) of the terminal (1).

2. The method as claimed in claim 1, wherein the content further comprises at least one element from a group, which includes audio data or video data.

3. The method as claimed in claim 1, wherein the content on the mobile digital terminal is permanently stored or buffered in a file, said file (2, 2'), in addition to data to be output, contains the control commands (<c1>, <c2>).

4. The method as claimed in claim 1, further comprising retrieving the content via an internet streaming service from a computer network.

5. The method as claimed in claim 1, further comprising implementing the function of the external device (6-8) which is at least one change in an operating state of the external device (6-8).

6. The method as claimed in claim 5, wherein the external device (10) is a wirelessly addressable mobile wireless or internet access device and the function of the external device (10) which is implemented includes a provision of data (11b) for the mobile terminal (1) and an execution or display thereof by the mobile terminal (1), or the function of the external device (10) which is implemented includes an activation of a further external device.

7. The method as claimed in claim 5, wherein the external device is a wirelessly switchable light bulb (6).

8. The method as claimed in claim 5, wherein the external device is at least one of a children's toy, model vehicle, model airplane, or doll (7).

9. The method as claimed in claim 5, wherein the external device is an audio playback device.

10. The method as claimed in claim 5, wherein the external device is an image display device.

11. The method as claimed in claim 5, wherein the external device is an electro-mechanical massager or a fragrance dispenser (8).

12. The method as claimed in claim 1, wherein a conceptual content of the content section in which the control command (<c1>, <c2>) is embedded or linked, is related to a user perceivable function of the external device (6-8).

13. A mobile digital terminal (1) configured with a software program product for controlling an external device (6-8, 10) with wireless communication function (6a-8a, 10a), comprising the mobile digital terminal (1) being configured by,
  a) an application that is executed on the mobile digital terminal (1), which sequentially outputs a temporally changing digital content by an output unit of the mobile digital terminal (1) that displays said content on a display (1a) of the terminal (1), said content contains, in addition to the output data, a set of embedded or linked control commands (<c1>, <c2>), which are sequentially executed by the mobile digital terminal (1) when sequentially displaying the content in accordance with a flow control of the mobile digital terminal (1), and
  b) when at least one specific control command (<c1>, <c2>) from the set of control commands (<c1>, <c2>) is reached, the mobile digital terminal (1) is configured to wirelessly control the external device (6-8, 10) via a wireless communication module (1e) in order to implement a function of the external device (6-8, 10) in a substantially synchronous manner with the display of the content or a section of the content, the content comprising at least alphanumeric text (2a, 2a'), and the content being displayed as the alphanumeric text (2a, 2a') as scrolling text (3, 3') on a display (1a) of the terminal (1), said text (2a, 2a') being generated from a file (2, 2') that contains the control commands (<c1>, <c2>) in addition to the data to be displayed, and the scrolling text (3, 3') is displayed horizontally and sequentially on the display (1a) of the terminal (1), wherein said function of the external device (6-8, 10) is commanded automatically by the mobile digital terminal (1) in synchronism with sequentially displaying the alphanumeric text (2a, 2a') on the display (1a) of the terminal (1).

14. The mobile digital terminal (1) as claimed in claim 13, further comprising the mobile digital terminal being configured by the software program to permanently store or at least buffer in a file, the content, said file (2, 2'), in addition to data to be output, contains the control commands (<c1>, <c2>).

15. A mobile digital terminal (1), which is designed to control an external device (6-8, 10) with a wireless communication function (6a-8a, 10a), the mobile digital terminal (1) comprising a processor configured to sequentially output by an application, a digital content which changes over time, by an output unit of the terminal (1), said content in addition to data to be output contains a set of embedded or linked control commands (<c1>, <c2>) which are sequentially executed by the mobile digital terminal (1) when sequentially displaying the content in accordance with a flow control of the mobile digital terminal (1), and a wireless communication module (1e), said mobile digital terminal (1) is further configured such that, during the processing of a file for the digital content (2, 2') upon reaching at least one specific control command (<c1>, <c2>) from the set of control commands (<c1>, <c2>), to wirelessly control the external device (6-8, 10) by the wireless communication module (1e) in order to implement a function of the external device (6-8, 10) in a substantially synchronous manner with the display of the content or a section of the content, the content comprising at least alphanumeric text (2a, 2a'), the content being displayed as the alphanumeric text (2a, 2a') as scrolling text (3, 3') on a display (1a) of the mobile digital terminal (1), said text (2a, 2a') being generated from a file (2, 2') that contains the control commands (<c1>, <c2>) in addition to the data to be displayed, and the scrolling text (3, 3') being displayed horizontally and sequentially on the display (1a) of the mobile digital terminal (1), wherein said function of the external device (6-8, 10) is commanded automatically by the mobile digital terminal (1) in synchronism with sequentially displaying the alphanumeric text (2a, 2a') on the display (1a) of the terminal (1).

16. The mobile digital terminal device (1) as claimed in claim 15, wherein the mobile digital terminal device is further configured to retrieve the content via an internet streaming service from a computer network.

17. A mobile digital terminal (1), comprising a memory and a software program product stored in the memory for controlling an external device (6-8, 10) with a wireless communication function (6a-8a, 10a), by the installation and execution of which on the mobile digital terminal (1)
  a) an application is executed on the mobile digital terminal (1), which sequentially outputs a temporally changing digital content by an output unit of the mobile digital terminal (1), which content contains, in addition to output data, a set of embedded or linked control commands (<c1>, <c2>), which are sequentially executed by the mobile digital terminal (1) when sequentially displaying the content in accordance with a flow control of the mobile digital terminal (1), and
  b) a wireless communication module (1e) that, when at least one specific control command (<c1>, <c2>) from the set of control commands (<c1>, <c2>) is reached, wirelessly controls the external device (6-8, 10) in order to implement a function of the external device (6-8, 10) in a substantially synchronous manner with the display of the content or a section of the content, the content comprising at least alphanumeric text (2a, 2a'), the content being displayed as the alphanumeric text (2*a*, 2*a*') as scrolling text (3, 3') on a display (1*a*) of the mobile digital terminal (1), said text (2*a*, 2*a*') being generated from a file (2, 2') that contains the control commands (<c 1>, <c2>) in addition to the data to be displayed, and the scrolling text (3, 3') being displayed horizontally and sequentially on the display (1*a*) of the mobile digital terminal (1), wherein said function of the external device (6-8, 10) is commanded automatically by the mobile digital terminal (1) in synchronism with sequentially displaying the alphanumeric text (2*a*, 2*a*') on the display (1*a*) of the terminal (1).

\* \* \* \* \*